(12) United States Patent
Singh et al.

(10) Patent No.: US 8,117,621 B2
(45) Date of Patent: Feb. 14, 2012

(54) SIMULATING A MULTI-QUEUE SCHEDULER USING A SINGLE QUEUE ON A PROCESSOR

(75) Inventors: Balbir Singh, Karnataka (IN);
Vaddagiri Srivatsa, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/877,785

(22) Filed: Oct. 24, 2007

(65) Prior Publication Data
US 2009/0113432 A1 Apr. 30, 2009

(51) Int. Cl.
*G06F 9/46* (2006.01)
(52) U.S. Cl. ......... 718/107; 718/100; 718/102; 718/108
(58) Field of Classification Search .................. None
See application file for complete search history.

(56) References Cited

U.S. PATENT DOCUMENTS

| | | | |
|---|---|---|---|
| 6,205,150 B1 * | 3/2001 | Ruszczyk | 370/412 |
| 2003/0037091 A1 * | 2/2003 | Nishimura et al. | 709/103 |
| 2005/0243848 A1 | 11/2005 | Yuan et al. | |

FOREIGN PATENT DOCUMENTS

EP 1286264 2/2003

OTHER PUBLICATIONS

Bogdan Caprita, Yuan Zheng, Isolation-Conscious Resource Management in Clusters of Workstations, Source -http://web.archive.org/web/20050221084642/http://www.columbia.edu/~bc2008/papers/cluster_sched.pdf.
Vaddagiri Srivatsa, [RFC] Fair-user scheduler, Source—http://readlist.com/lists/vger.kernel.org/linux-kernel/59/298744.html.

* cited by examiner

*Primary Examiner* — Kenneth Tang
(74) *Attorney, Agent, or Firm* — Yee & Associates, P.C.; Libby Z. Toub

(57) ABSTRACT

A method and system for scheduling tasks on a processor, the tasks being scheduled by an operating system to run on the processor in a predetermined order, the method comprising identifying and creating task groups of all related tasks; assigning the tasks in the task groups into a single common run-queue; selecting a task at the start of the run-queue; determining if the task at the start of the run-queue is eligible to be run based on a pre-defined timeslice allocated and on the presence of older starving tasks on the runqueue; executing the task in the pre-defined time slice; associating a starving status to all unexecuted tasks and running all until all tasks in the run-queue complete execution and the run-queue become empty.

14 Claims, 8 Drawing Sheets

SIMULATING A MULTI-QUEUE SCHEDULER USING A SINGLE QUEUE ON A PROCESSOR

BACKGROUND OF THE INVENTION

1. Technical Field

The present invention relates to a method for simulating a multi-queue scheduler using a single queue.

2. Description of the Related Art

In a task scheduling method conventionally used by an operating system (OS) to schedule a plurality of tasks, the tasks are executed sequentially in accordance with a priority level determined for each of the tasks. Furthermore, when plural tasks have the same priority level, the tasks are commonly executed in order on a round-robin basis within a limited time period shown by a timeslice value.

Here, a task scheduling device as referred to herein corresponds to a part of the OS, and tasks are processing units targeted for scheduling, each task generally corresponding to an entire application program (AP) or a section of an AP. As a result of a scheduling operation performed by a task scheduling device, all or a section of an AP corresponding to a task to be executed is sequentially allotted a period of CPU processing time, and executed sequentially by the CPU under the control of a conventional program execution control device, which corresponds to a part of the OS. Hereafter, the "execution of a task" is defined to mean the execution of all or a section of an AP corresponding to the task.

FIG. 1A illustrates an exemplary embodiment of a scheduler and the corresponding run-queue. Illustrated is a CPU, CPU 110, such as a processor the functionality of which is to execute various applications or tasks. In a multi-tasking system, multiple tasks could "appear" to be executing on the CPU 100 simultaneously. The operating system scheduler 120 schedules each task in the system to run on the CPU 110 one after the other in a pre-determined order. Each task is allowed to run for short time durations, called its timeslice. As the task keeps executing, the scheduler tracks its CPU 110 usage, and when the task has executed its allocated/complete timeslice, the scheduler 120 stops the task from further execution and causes any of the other tasks to be scheduled on the CPU 110.

To keep track of various tasks to be executed in a system, the scheduler 120 typically uses some data-structure called run-queue (rq). FIG. 1A illustrates a simple run-queue, a linked list labeled as rq. The run-queue rq has three tasks in it, labeled as A0, A1 and A2. The tasks are arranged in the run-queue in some order, which may be a pre-determined order. For example, it could be sorted by the time of arrival/creation, or by their priority.

A typical algorithm for the scheduler 120 can be described in these steps:

(i) Select a task at the front of the queue.
(ii) Arrange for the CPU to execute the selected task
(iii) As the selected task continues to execute, continuously track its CPU usage.
(iv) When the selected task has run to its allocated timeslice (task timeslice), T, stop the task from further execution
(v) Renew the timeslice for the task to T and move the task to the end of queue.
(vi) Go to step (i)

Here timeslice, i.e., the task timeslice, is a field in every task that denotes the amount of time left for the task to expire its allocated timeslice. A task is said to have expired its timeslice if its timeslice (task timeslice) field becomes 0. Assuming that the above algorithm is being executed for a task, the following execution pattern can be observed on the CPU in the following order: A0 [T], A1 [T], A2 [T], A0 [T], A1 [T] etc. A0 first executes on the CPU for T seconds (its timeslice), then A1 executes for T seconds, followed by A2 executing for T seconds. Then A0 gets to run again for T seconds. This pattern is repeated until the all tasks are executed completely and the runqueue (hereinafter also referred to as a queue) becomes empty. This simple scheme ensures that all tasks get a fair time on the CPU, without one particular task starving the others for too long.

Grouping tasks in the run-queue into different groups/categories is preferred. All tasks belonging to a root user could be termed the "root" group, while all tasks belonging to the "guest" user could be termed as the "guest" group. The scheduler could use this grouping information to further control the CPU resource allocation, i.e, the scheduler can hand-out/control CPU time among such groups fairly first and then to the tasks in a group. For example, consider that "guest" group has 100 tasks while "root" group has just one task. Going by the simple algorithm described previously in [0006], the "guest" group of tasks can potentially consume all the CPU (since they have more number of tasks) starving the "root" group of tasks (which has just one task). Therefore, a task-group aware scheduler can avoid such starvation by allocating CPU time fairly among groups first and them among the tasks of that group. Thus over some arbitrary interval of K seconds (termed as epoch period), the task-group aware scheduler can ensure that "guest" group of tasks get execution time worth K/2 seconds while "root" group of tasks get execution worth K/2 seconds. The CPU bandwidth allocated to each group is further divided fairly among the tasks of that group.

FIG. 1B illustrates an exemplary embodiment of a scheduler with two run-queues for each task group. To provide fairness to such task-groups, the scheduler could use separate queues for each group. FIG. 1B shows such an example. There are two run-queues, rq0 and rq1. rq0 stores tasks belong to group A, while rq1 stores tasks belonging to group B. In this scenario, the scheduler 120 could follow this scheme to run tasks as follows:

(i) Select a queue from which to pick a task (either rq0 or rq1). The selected queue (representing a task-group) should be such that it has some timeslice (a group timeslice) left in current epoch.
(ii) Select the task at the front of the selected queue.
(iii) Arrange for the CPU 110 to execute the selected task
(iv) As the selected task continues to execute, continuously track its CPU usage and also the CPU usage of the group to which the task(s) belongs.
(v) When the selected task has run to its allocated/complete task timeslice, T, OR when the group, to which the selected task belongs, has run to its allocated/complete group timeslice, K/2, stop the task from further execution.
(vi) Move the task that was just stopped to the end of its queue,
 if the task has expired its task timeslice in Step (v);
 else let it remain at the front of the queue.
(vii) Go to step (i)

Here the group timeslice is a field in every group that denotes the time left for the group to expire its allocated timeslice in the current epoch. A group is said to have expired its timeslice if its group timeslice field becomes 0.

Consider that the epoch interval K, over which group fairness is provided, is 3 T seconds. Thus in 3 T seconds, group A should have received 1.5 T seconds worth of execution while group B should have received 1.5 T seconds worth of execution. the execution pattern observed could be as follows:

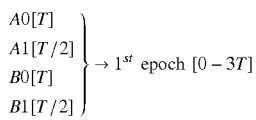
$$\left.\begin{array}{l} A0[T] \\ A1[T/2] \\ B0[T] \\ B1[T/2] \end{array}\right\} \rightarrow 1^{st} \text{ epoch } [0-3T]$$

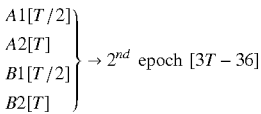
$$\left.\begin{array}{l} A1[T/2] \\ A2[T] \\ B1[T/2] \\ B2[T] \end{array}\right\} \rightarrow 2^{nd} \text{ epoch } [3T-36]$$

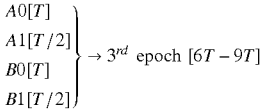
$$\left.\begin{array}{l} A0[T] \\ A1[T/2] \\ B0[T] \\ B1[T/2] \end{array}\right\} \rightarrow 3^{rd} \text{ epoch } [6T-9T]$$

Extracting the execution pattern of group A tasks alone, the following data is observed A0 [T], A1 [T] and A2 [T], i.e., A0 executes for T seconds first, then A1 for T seconds followed by A2 for T seconds and it repeats like this afterwards.

FIG. 1C illustrates an exemplary embodiment of a single run-queue hosting multiple groups. It may be advantageous to sometimes avoid the complexity and cost of maintaining such multiple queues. Each additional queue could require additional memory/hardware, the cost of which could be prohibitive in some scenarios. We thus consider a task-group aware scheduler that works on a single run-queue. FIG. 1C shows a runqueue which stores tasks from both group A and B.

A disadvantage with the prior art is ensuring that different tasks of same group are run in the same order as if they had their own run-queue. Accordingly, without a way to provide an improved method for implementing scheduling of tasks on a processor, the promise of this technology may never be fully achieved

SUMMARY

A method and system for scheduling tasks on a processor, the tasks being scheduled by an operating system to run on the processor in a predetermined order, the method comprising identifying and creating task groups of all related tasks; assigning the tasks in the task groups into a single common run-queue; selecting a task at the start of the run-queue; determining if the task at the start of the run-queue is eligible to be run based on a pre-defined timeslice allocated and the presence of other older starving tasks in runqueue; executing the task in the pre-defined time slice; associating a starving status to all unexecuted tasks and running all until all tasks in the run-queue complete execution and the run-queue become empty.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 2:
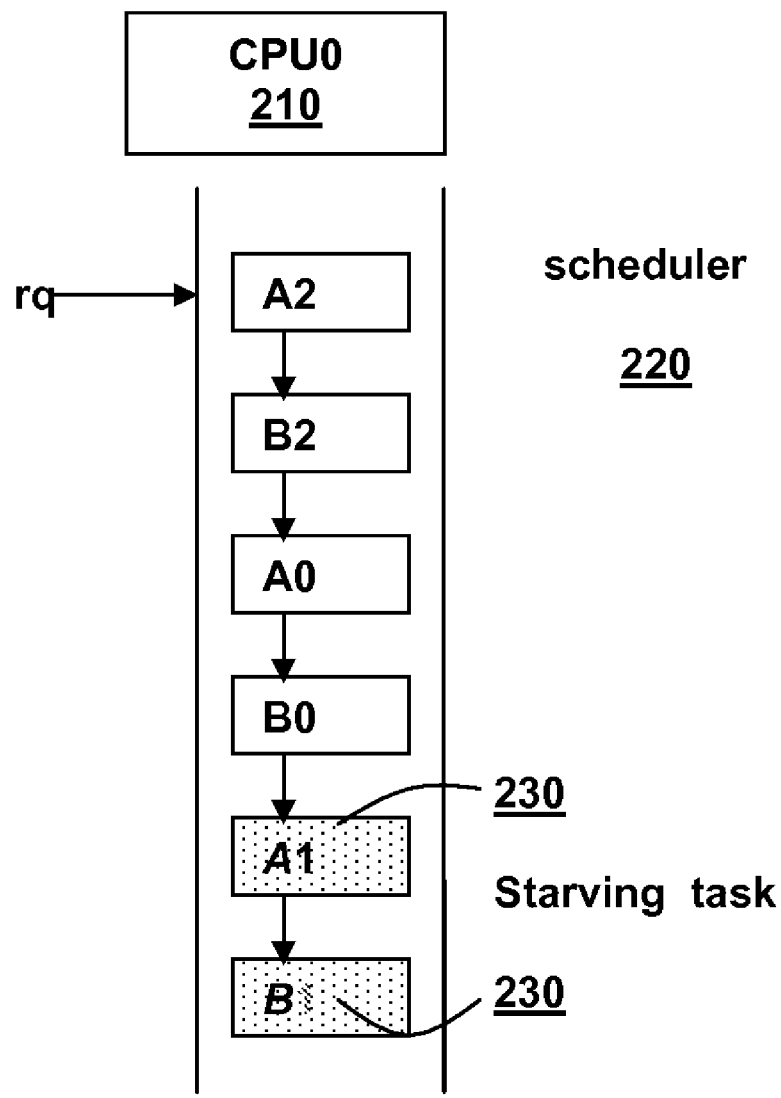
FIG. 2 illustrates an exemplary embodiment of a run-queue in accordance with the present invention.

FIG. 2 illustrates an exemplary embodiment of scheduling tasks 200 in accordance with the present invention. The scheduler 220 does not use separate queues for each group here, but categorizes the tasks into relevant groups and executes these tasks in accordance with a pre-determined schedules. There is a single rq, which stores tasks belong to group A and group B and executes them in an order. Once tasks in a particular group has used its allocated timeslice, the remaining tasks are then moved to the end of the run-queue and are shown in FIG. 2 as starving tasks 230. In a normal consequence, these would have been executed in the remaining timeslice, however since there is insufficient timeslice available, the tasks cannot be completely executed and causes the system to consume resources, thereby wasting system resources, power etc.

In accordance with the present invention, the definition associated with terms is provided for a skilled person to understand the mechanics of the working of the invention. A starve_id is defined to be a counter, introduced for every task. To start with, the starve_id has a value 0 for every task. The scheduler 120 can set this field for a task, if the task was denied an opportunity to run/execute to its full timeslice in any particular epoch, which can result because its group has expired its group-timeslice in that epoch. The starve_id counter is cleared when the same task gets an opportunity to run/execute its full timeslice in subsequent epochs. A starve_count is defined to be a counter, introduced for every group. It can be 0 or some positive count. To start with, it has a value 0 for every group. It is incremented whenever a task of that group is marked as starving and decremented whenever the starve_id counter is cleared for a task of its group. Therefore, it represents the total number of starving tasks in the group. A next_starve_id is defined to be a counter, introduced for every group. To start with, it has a value 0 for every group. At any given time, a group may have more than one starving task. This field indicates the most eligible starving task in that set, which has to be run next on the CPU 210. A max_starve_id is defined to be a counter, introduced for every group. To start with, it has a value 0 for every group. This field indicates the maximum starve_id being used by any starving task of this group.

A implementation of the algorithm of implementing the scheduling of tasks in accordance with the present invention has the following steps:

(i) Begin Scheduling of tasks
(ii) Note the first task on the queue as pfirst, and initialize loop_count to −1.
(iii) Select the task p at the front of the queue.
(iv) Check if p==pfirst, if true the increment loop_count and check that loop_count is greater than 0.
(v) Begin a new epoch by renewing all group timeslices, if and only if looped around in the queue more than once (loop_count>1) OR the current epoch has ended. A loop_count>1 indicates that there is no task in the queue whose queue has available group_timeslice.
(vi) Avoid running the task p, if its group has expired its group_timeslice in current epoch. On the other hand, if p's group has not yet expired its group_timeslice, then go to perform instruction (ix) indicated below.
(vii) Mark the task starving, by invoking mark_task starving.
(viii) Move the task to the back of the queue (thereby denying it an opportunity to run on CPU) and go to step (iii).
(ix) This step is incorporated if the group, to which the selected task belongs, has non-zero group_timeslice left. Avoid running the task p, if its group has starving tasks and p is not the next eligible starving task, in that case go to step (vii). On the other hand, if its group does not have any starving tasks OR p is the next eligible starving task, then go to (x).
(x) Renew the timeslice of the task, if its task_timeslice is zero.
(xi) Execute the task on the CPU
(xii) As the task continues to execute, continuously monitor its CPU usage and its group's CPU usage
(xiii) As soon as either the task has run to its full task_timeslice OR its group expires its group_timeslice, stop the task from further execution
(xiv) Clear the task's starving status, by invoking clear_task_strarving( ), if the task was stopped in step (xiii) because it exhausted its task_timeslice
(xv) Mark the task starving, by invoking mark_task_starving( ), if the task was stopped in Step (xiii) because its group expired its group_timeslice
(xvi) Go to step (i)

These steps will be discussed in more details with respect to FIG. 3.

Thus a task is eligible to run on the CPU, if and only if its group has available timeslice and it is oldest starving task in its group. The two main function involved in the scheduling and execution of the tasks mark_task_starving( ) and clear_task_starving( ) are detailed below.

The function mark_task_starving( ), involves:
(i) Return (do nothing), if the task is already marked starving (starve_id>0) OR if the task's task_timeslice is zero.
(ii) If none of the above conditions are true, increment the max_starve_id field of the group, to which the task belongs, and set the task's starve_id field to max_starve_id. Also increment the starve_count field of the group and if the next_starve_id field of the group is 0, set next_starve_id field to 1.

The function clear_task_starving( ), involves:
(i) Return (do nothing), if the task is not marked starving (i.e its starve_id field is 0)

(ii) Reset starve_id field of the task to zero, decrement starve_count field of the group, to which the task belongs and increment next_starve_id field of the group. If the next_starve_id field of the group becomes greater than max_starve_id field, then reset both next_starve_id and max_starve_id fields for the group.

clear_task_starving) is invoked on a task when it has run to its full-timeslice in any epoch or when it is being removed from the runqueue for any reason (For example, if it is exiting, or is being moved to a different CPU's runqueue).

Figure 1:
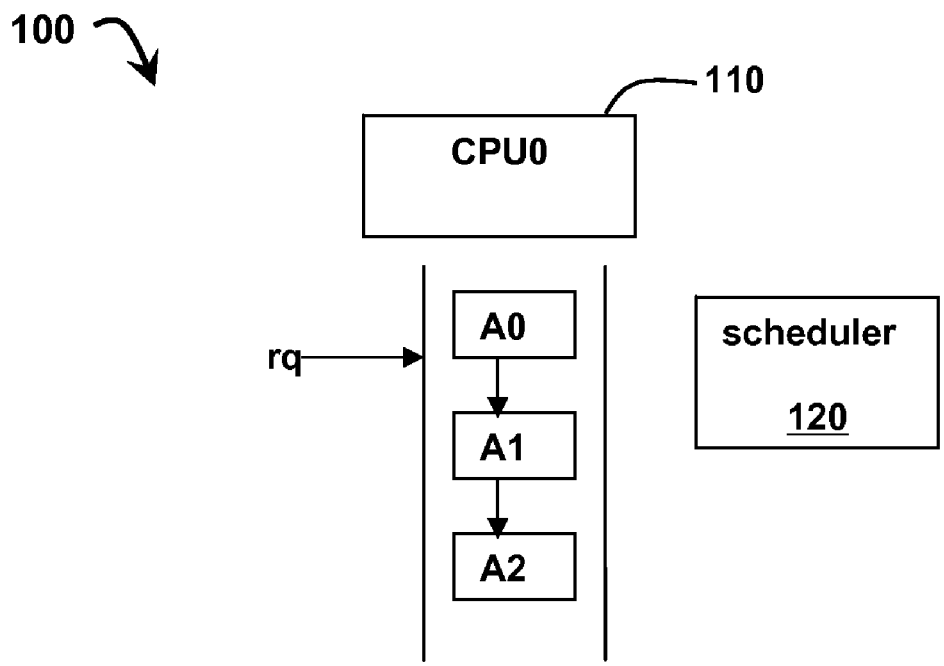
FIG. 1A illustrates an exemplary embodiment of a scheduler and its run-queue.
FIG. 1B illustrates an exemplary embodiment of a scheduler with two run-queues for each task group.
FIG. 1C illustrates an exemplary embodiment of a single run-queue hosting multiple groups.
Figure 1:
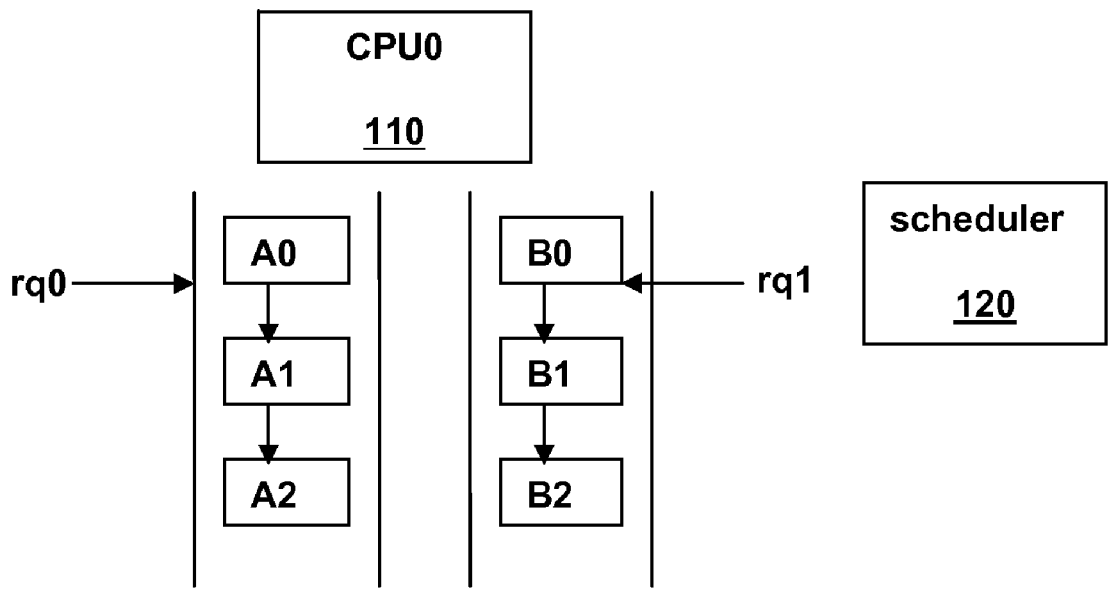
Figure 1:
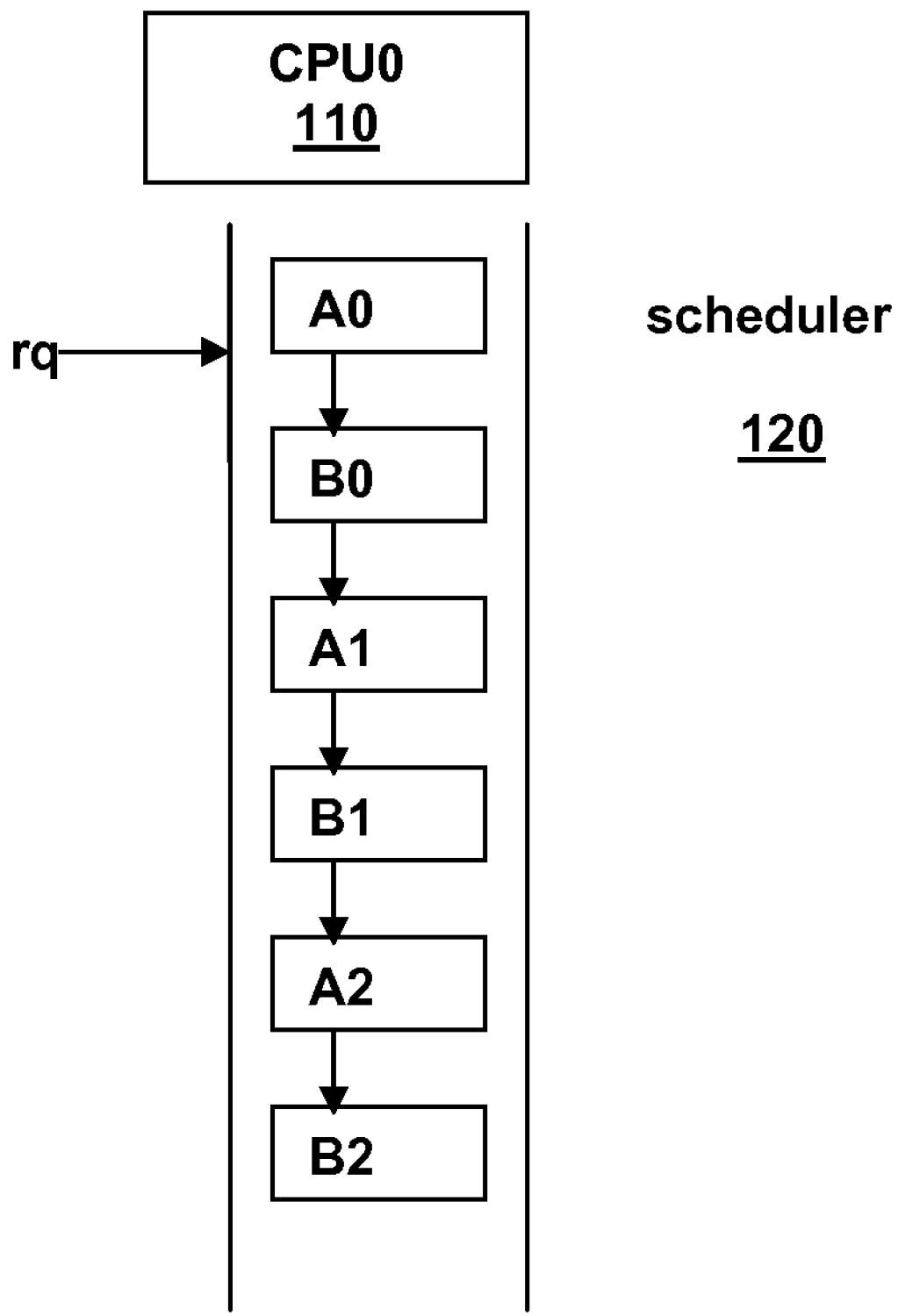

A detailed execution pattern in time as obtained by these steps and considering these initial conditions by making reference to FIG. 1C.

(i) Begin executing tasks in FIG. 1C at time t0
(ii) Epoch period is 3 T
(iii) The group_timeslice for both groups A and B is set to 1.5 T (since epoch K is 3 T and both groups have to get equal time in that epoch).
(iv) The tasks_timeslice for each task is set to T
(v) The starve_id field of all tasks is cleared.
(vi) The starve_count, max_starve_id, next_starve_id for both groups A and B is set to zero At t0, task A0 is selected from the queue. It is allowed to execute on the CPU, since its group A has non-zero group_timeslice and Group A doesn't have any other starving tasks [GrpA->group_timeslice=1.5; GrpA->starve_count=0; GrpA->next_starve_id=0; GrpA->max_starve_id=0; GrpB->group_timeslice=1.5 T, GrpB->starve_count=0; GrpB->next_starve_id=0; GrpB->max_starve_id=0;]

At t0+T, task A0 expires its timeslice i.e its task_timeslice becomes 0. It is moved to the back of the queue, with its task_timeslice retained at 0. [GrpA->group_timeslice=0.5 T; GrpA->starve_count=0; GrpA->next_starve_id=0; GrpA->max_starve_id=0; GrpB->group_timeslice=1.5 T; GrpB->starve_count=0; GrpB->next_starve_id=0; GrpB->max_starve_id=0;]

At t0+T, task B0 is selected from the queue. It is allowed to execute on the CPU, since its group B has non-zero group_timeslice and Group B doesn't have any other starving tasks. [GrpA->group_timeslice=0.5 T; GrpA->starve_count=0; GrpA->next_starve_id=0; GrpA->max_starve_id=0; GrpB->group_timeslice=1.5 T; GrpB->starve_count=0; GrpB->next starve_id=0; GrpB->max_starve_id=0;]

At t0+2 T, task B0 expires its timeslice i.e its task_timeslice becomes 0. It is moved to the back of the queue, with its task_timeslice retained at 0. [GrpA->group_timeslice=0.5 T; GrpA->starve_count=0; GrpA->next_starve_id=0; GrpA->max_starve_id=0; GrpB->group_timeslice=0.5 T; GrpB->starve_count=0; GrpB->next_starve_id=0; GrpB->max_ starve_id=0;].

At t0+2 T, task A1 is selected next. It is allowed to execute on the CPU, since its group A has non-zero group_timeslice left and Group A doesn't have any other starving tasks. [GrpA->group_timeslice=0.5 T; GrpA->starve_count=0; GrpA->next_starve_id=0; GrpA->max_starve_id=0; GrpB->group_timeslice=0.5 T; GrpB->starve_count=0; GrpB->next_starve_id=0; GrpB->max starve_id=0;]

At, t0+2.5 T, Group A expires its timeslice i.e GrpA->group_timeslice becomes 0. Task A1 is stopped from further execution and is moved to back of the queue. Since A1 had got to run only for 0.5 T seconds, it is marked starving (A1.starve_id=1) and group A's starve_count is incremented.[GrpA->group_timeslice=0 T; GrpA->starve_count=1; GrpA->next_starve_id=1; GrpA->max starve_id=1; GrpB->group_timeslice=0.5 T; GrpB->starve_count=0; GrpB->next starve_id=0; GrpB->max_starve_id=0;]

At, t0+2.5 T task B1 is selected next from runqueue. It is allowed to execute on the CPU, since its group B has non-zero group_timeslice and Group B doesn't have any other starving tasks. [GrpA->group_timeslice=0 T; GrpA->starve_count=1; GrpA->next_starve_id=1; GrpA->max_starve_id=1; GrpB->group_timeslice=0.5 T; GrpB->starve_count=0; GrpB->next_starve_id=0; GrpB->max_starve_id=0;]

At t0+3 T, Group B expires its timeslice i.e GrpB->group_timeslice becomes 0. Task B1 is stopped from further execution and is moved to back of the queue. Since B1 had got to run only for 0.5 T seconds, it is marked starving (B1.starve_id=1) and group B's starve_count is incremented. [GrpA->group_timeslice=0 T; GrpA->starve_count=1; GrpA->next starve_id=1; GrpA->max_starve_id=1; GrpB->group_timeslice=0 T; GrpB->starve_count=1; GrpB->next_starve_id=1; GrpB->max_starve_id=1;]

Figure 4:
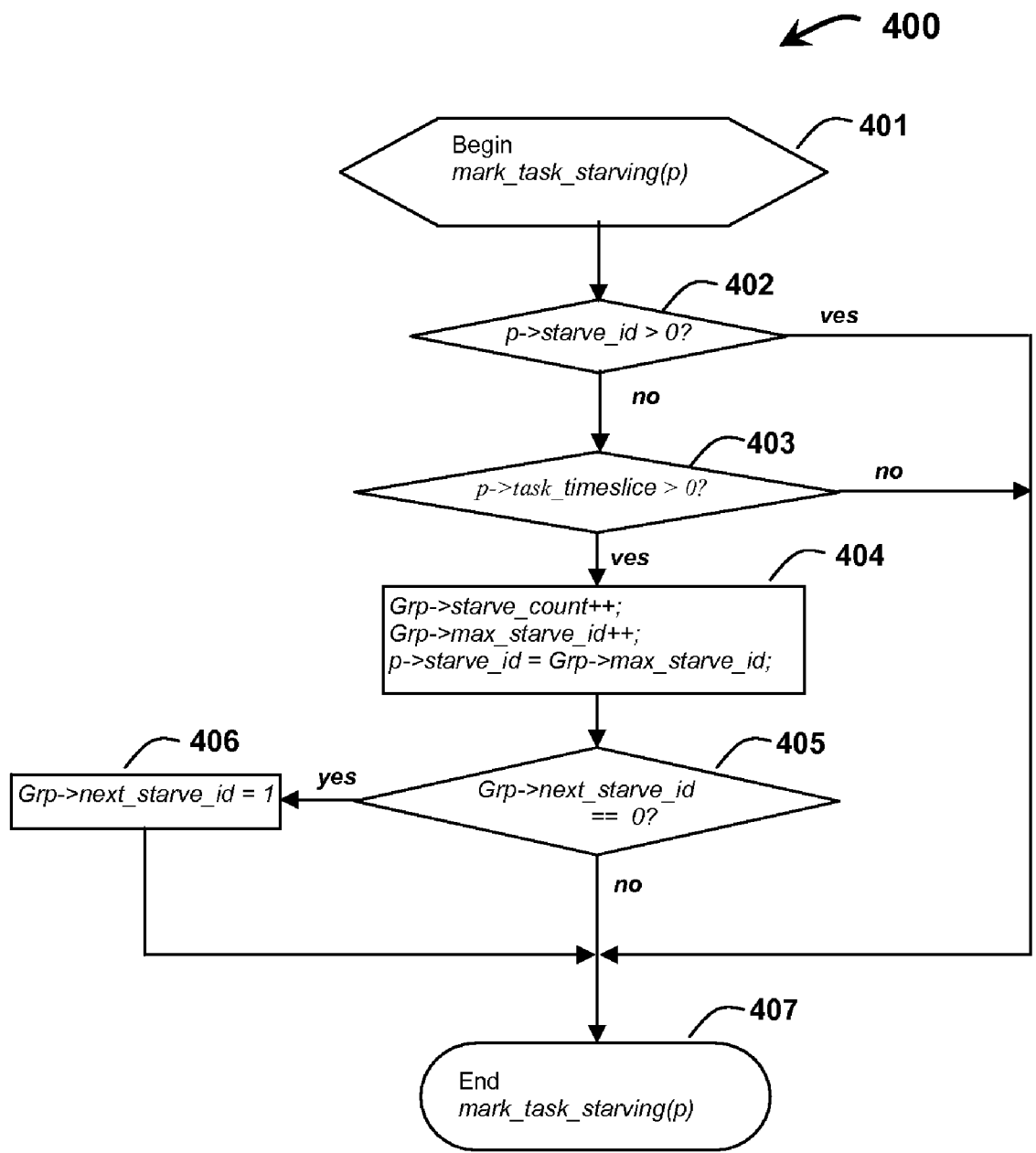
FIG. 4 illustrates an exemplary embodiment of a method for executing the function for marking a task in the task group as a starving task.

At, t0+3 T, all groups have expired their group_timeslice and one epoch has ended. The situation of the queue is shown in FIG. 4. group_timeslice for all groups is renewed. [GrpA->group_timeslice=1.5 T; GrpA->starve_count=1; GrpA->next_starve_id=1; GrpA->max_starve_id=1; GrpB->group_timeslice=1.5 T; GrpB->starve_count=1; GrpB->next_starve_id=1; GrpB->max starve_id=1;]

At, t0+3 T, task A2 is selected next from the queue. However it is not allowed to execute because its group has other starving tasks (GrpA->starve_count=1) and A2 is not the next eligible starving task. Task A2 is moved to back of queue. It is also marked starving (A2.starve_id=1), since it had non-zero task_timeslice and Group A's starve_count is incremented by (GrpA->starving_count=2). [GrpA->group_timeslice=1.5 T; GrpA->starve_count=2; GrpA->next_starve_id=1; GrpA->max starve_id=2; GrpB->group_timeslice=1.5 T; GrpB->starve_count=1; GrpB->next_starve_id=1; GrpB->max_starve_id=1;]

At t0+3 T task B2 is selected next from the queue. However it is not allowed to execute because its group has other starving tasks (GrpB->starve_count=1) and B2 is not the next eligible starving task. Task B2 is moved to back of queue. It is also marked starving (B2.starve_id=1), since it had non-zero task_timeslice and Group B's starve_count is incremented by 1 (GrpB->starving_count=2). [GrpA->group_timeslice=1.5 T; GrpA->starve_count=2; GrpA->next_starve_id=1; GrpA->max starve_id=2; GrpB->group_timeslice=1.5 T; GrpB->starve_count=2; GrpB->next_starve_id=1; GrpB->max_starve_id=2;]

At, t0+3 T task A1 is selected next from the queue. It is allowed to execute because it is the next eligible starving task and its group has non-zero group_timeslice. [GrpA->group_timeslice=1.5 T; GrpA->starve_count=2; GrpA->next_starve_id=1; GrpA->max_starve_id=2; GrpB->group_timeslice=1.5 T; GrpB->starve_count=2; GrpB->next_starve_id=1; GrpB->max_starve_id=2;].

At t0+3.5 T task A1 expires its task_timeslice. It is moved to the back of the queue, with its task_timeslice retained at 0. Since A1 has completed its fulltimeslice and was marked starving earlier, its starve_id field is set to 0 and Group A's starve_count is decremented.[GrpA->group_timeslice=1 T; GrpA->starve_count=1; GrpA->next_starve_id=2; GrpA->max_starve_id=2; GrpB->group_timeslice=1.5 T; GrpB->starve_count=2; GrpB->next starve_id=1; GrpB->max_starve_id=2;].

Again at t0+3.5 T task B1 is selected next from the queue. It is allowed to execute because it is the next eligible starving task and its group has non-zero group_timeslice. [GrpA->group_timeslice=1 T; GrpA->starve_count=1; GrpA->next_starve_id=2; GrpA->max_starve_id=2; GrpB->group_timeslice=1.5 T; GrpB->starve_count=2; GrpB->next_starve_id=1; GrpB->max starve_id=2;]

At t0+4 T task B1 expires its task_timeslice. It is moved to the back of the queue, with its task_timeslice retained at 0. Since B1 has completed its fulltimeslice and was marked starving earlier, its starving field is set to 0 and Group B's starve_count is decremented. [GrpA->group_timeslice=1 T; GrpA->starve_count=1; GrpA->next_starve_id=2; GrpA->max_starve_id=2; GrpB->group_timeslice=1 T; GrpB->starve_count=1; GrpB->next_starve_id=2; GrpB->max starve_id=2;]

At t0+4 T, Task A2 is selected next from the queue. It is allowed to execute because it is next eligible starving task and its group has non-zero group_timeslice. [GrpA->group_timeslice=1 T; GrpA->starve_count=1; GrpA->next_starve_id=2; GrpA->max_starve_id=2; GrpB->group_timeslice=1 T, GrpB->starve_count=1; GrpB->next_starve_id=2; GrpB->max_starve_id=2;]

At t0+5 T, task A2 expires its task_timeslice. It is moved to the back of the queue, with its task_timeslice retained at 0. Since A2 has completed its fulltimeslice and was marked starving earlier, its starve_id field is set to 0 and Group A's starve_count is decremented. [GrpA->group_timeslice=0 T; GrpA->starve_count=0; GrpA->next_starve_id=0; GrpA->max_starve_id=0; GrpB->group_timeslice=1 T; GrpB->starve_count=1; GrpB->next_starve_id=2; GrpB->max_starve_id=2;]

At t0+5 T, task B2 is selected next from the queue. It is allowed to execute because it is next eligible starving task and its group has non-zero group_timeslice. [GrpA->group_timeslice=0 T; GrpA->starve_count=0; GrpA->next_starve_id=0; GrpA->max_starve_id=0; GrpB->group_timeslice=1 T; GrpB->starve_count=1; GrpB->next_starve_id=2; GrpB->max_starve_id=2;]

At t0+6 T, task B2 expires its task_timeslice. It is moved to the back of the queue, with its task_timeslice retained at 0. Since B2 has completed its fulltimeslice and was marked starving earlier, its starve_id field is set to 0 and Group B's starve_count is decremented. [GrpA->group_timeslice=0 T; GrpA->starve_count=0; GrpA->next_starve_id=0; GrpA->max_starve_id=0; GrpB->group_timeslice=0 T; GrpB->starve_count=0; GrpB->next_starve_id=0; GrpB->max starve_id=0;].

The process detailed above from time t=0 to t=t+6 T can continue repeating till all tasks in the runqueue are executed completely on the CPU and the runqueue becomes empty. Over a period of two epochs, t0-t0+6 T, Group A tasks have received 3 T worth of execution time and the execution pattern of group A tasks was like below:

A0 [T]
A1 [T]
A2 [T]

which is exactly as desired in accordance with the present invention.

Figure 3:
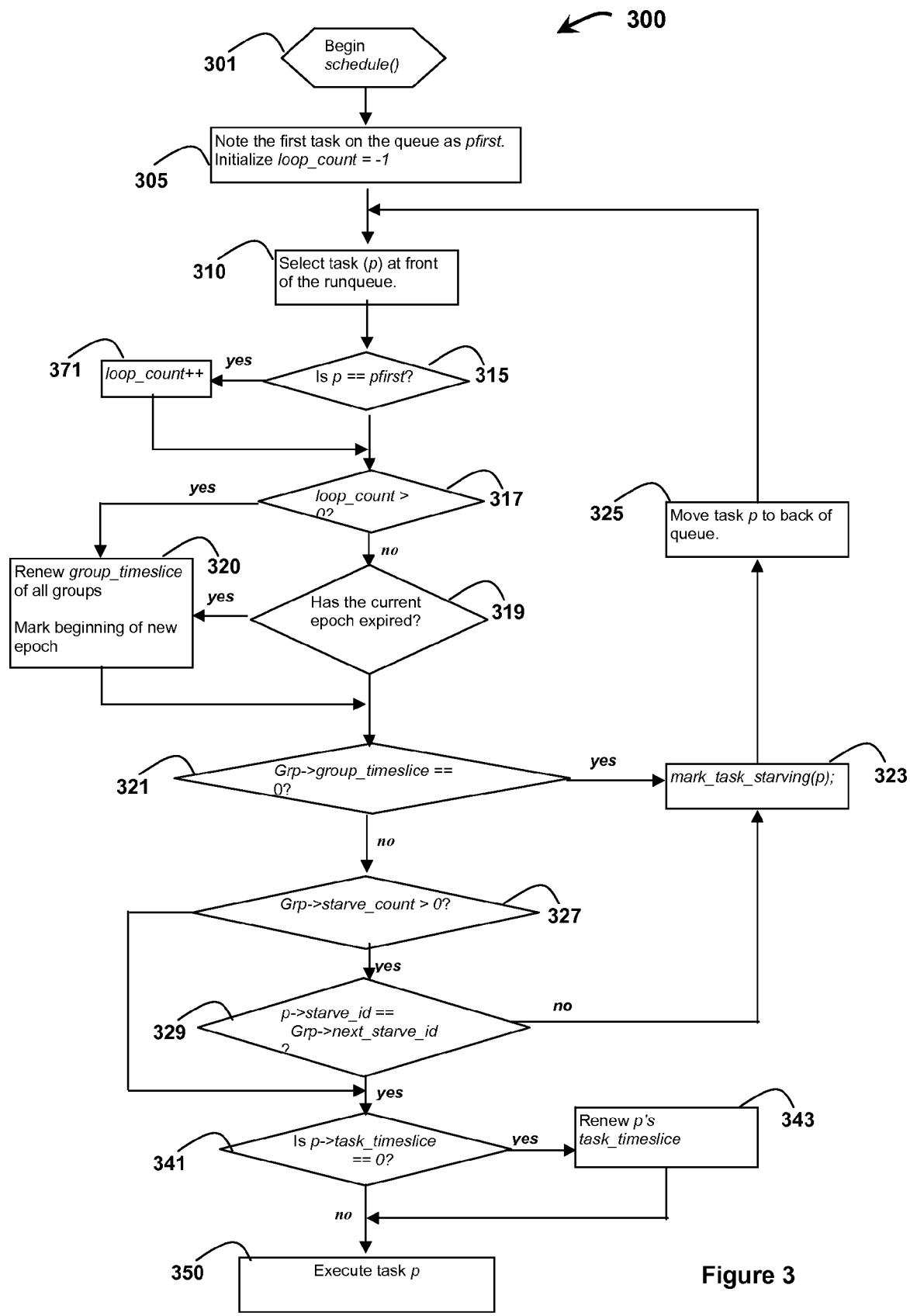
FIG. 3 illustrates an exemplary embodiment of a method for scheduling tasks in accordance with the present invention.

FIG. 3 illustrates an exemplary embodiment of a method 300 for scheduling tasks in accordance with the present invention. Step 301 is the entry point for scheduler. The function is invoked to select the next best eligible task on the runqueue (also referred to as a queue). In step 305 the first task on the queue is remembered in variable pfirst, and it initializes loop_count variable to −1. In Step 310 tasks are selected at the front or beginning of the queue. Let this task be noted in variable p. Also let the group to which p belongs be denoted in variable Grp. In Step 315 compare whether task p is same as task pfirst. If true, then go to step 371 else go to step 317. In step 371 the loop_count variable is incremented and in Step 317 a check is performed to determine if loop_count>1, which signifies that scheduler has examined all tasks on the runqueue, without being able to find any eligible task to run. In that case, go to step 320 (to renew timeslice for all groups), else go to perform step 319.

Step 319 checks if the time-period since the last renewed timeslice for all groups is more than the epoch period. If so, go to step 320. In step 320 timeslice for all groups is renewed, the current time at which group timeslice is being renewed (the beginning of new epoch that is) is also noted. In step 321 check whether the group, to which p belongs, has expired its timeslice, and if so, go to Step 323, else continue executing step 327, wherein a check is made to determine if the group Grp has any starving tasks. If not, then p is eligible to run, and go to Step 341, else continue executing step 329.

Step 329 checks whether task p is the next best starving task to be run i.e whether it is the oldest starving task in its group. If so, go to step 341, else continue with step 323. When task p is not eligible to run, the scheduler is at step 323, and mark the task as starving, by invoking function mark_task_starving( ). Next in step 325, the task marked as starving is moved back to the queue and control is transferred to 310. In step 341, which is arrived at if the task p is found eligible to run, check if its timeslice is zero, if true then go to step 343 to renew its timeslice, else go to step 350, wherein the task is executed. In step 350 the task p is executed on the CPU.

FIG. 4 illustrates an exemplary embodiment of a method 400 for executing the function for marking a task in the task group as a starving task. Step 401 is the entry point for the function. It accepts one argument, the task p which has to be marked starving. Let Grp be the group to which task p belongs. Step 402 checks whether the task is already marked starving (p->starve_id>0), and if true then go to step 407. Step 403 checks whether the task's timeslice is zero, and if so, it means that the task has run to a full-timeslice in the past and cannot be marked starving, and control is transferred to step 407. in that case. Step 404 first increments the number of starving tasks in the group (Grp->starve_count++), and then increments the max_starve_id field for the group. It then marks the task starving by setting its starve_id field to be same as group's max_starve_id. Step 405 check is made to determine whether the next_starve_id field is zero, and if true then go to step 406, else go to step 407. Step 406 sets the next_starve_id field for the group to 1, and finally step 407 marks the end of function mark_task_starving( ).

Figure 5:
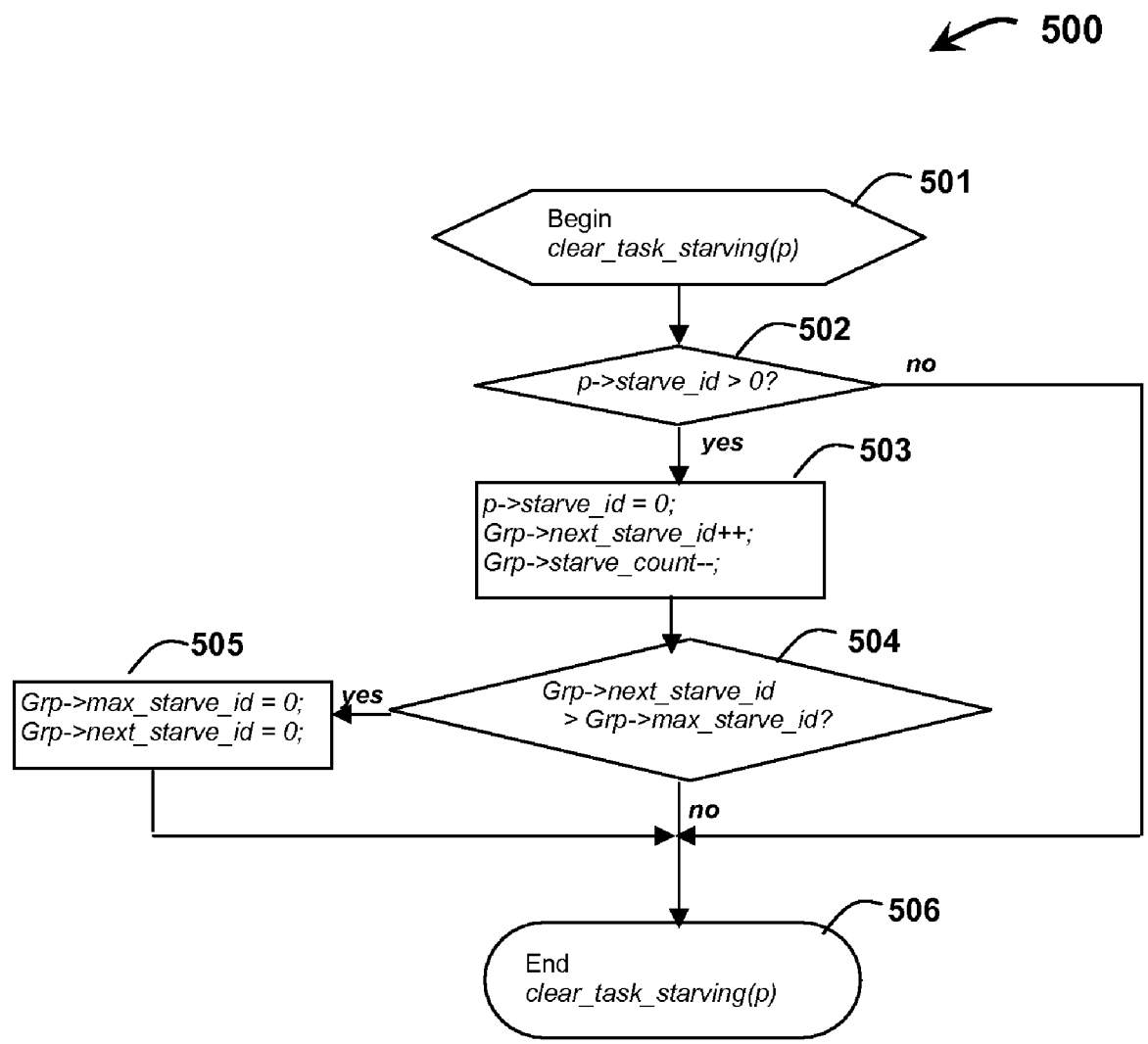
FIG. 5 illustrates an exemplary embodiment of a method for executing the function for clearing starving status of a task.

FIG. 5 illustrates an exemplary embodiment of a method 500 for executing the function for clearing any starving tasks. Step 501 is the entry point for the function. It accepts one argument, the task p, whose starving status has to be cleared. Let Grp be the group to which p belongs. Step 502 examines if the task is marked starving (p->starve_id>0), if false the go to step 506. Step 503 decrements Grp's starve_count and increments its next_starve_id field. It also reset's the task's starving status (p->starve_id=0). Step 504 checks whether we have accounted for all starving tasks, and go to step 505, else go to step 506. Step 505 is arrived if there are no more starving tasks in the group. In that case, reset fields next_starve_id and max_starve_id fields for the group, and step 506 marks the end of the function clear_task_starving( ).

Figure 6:
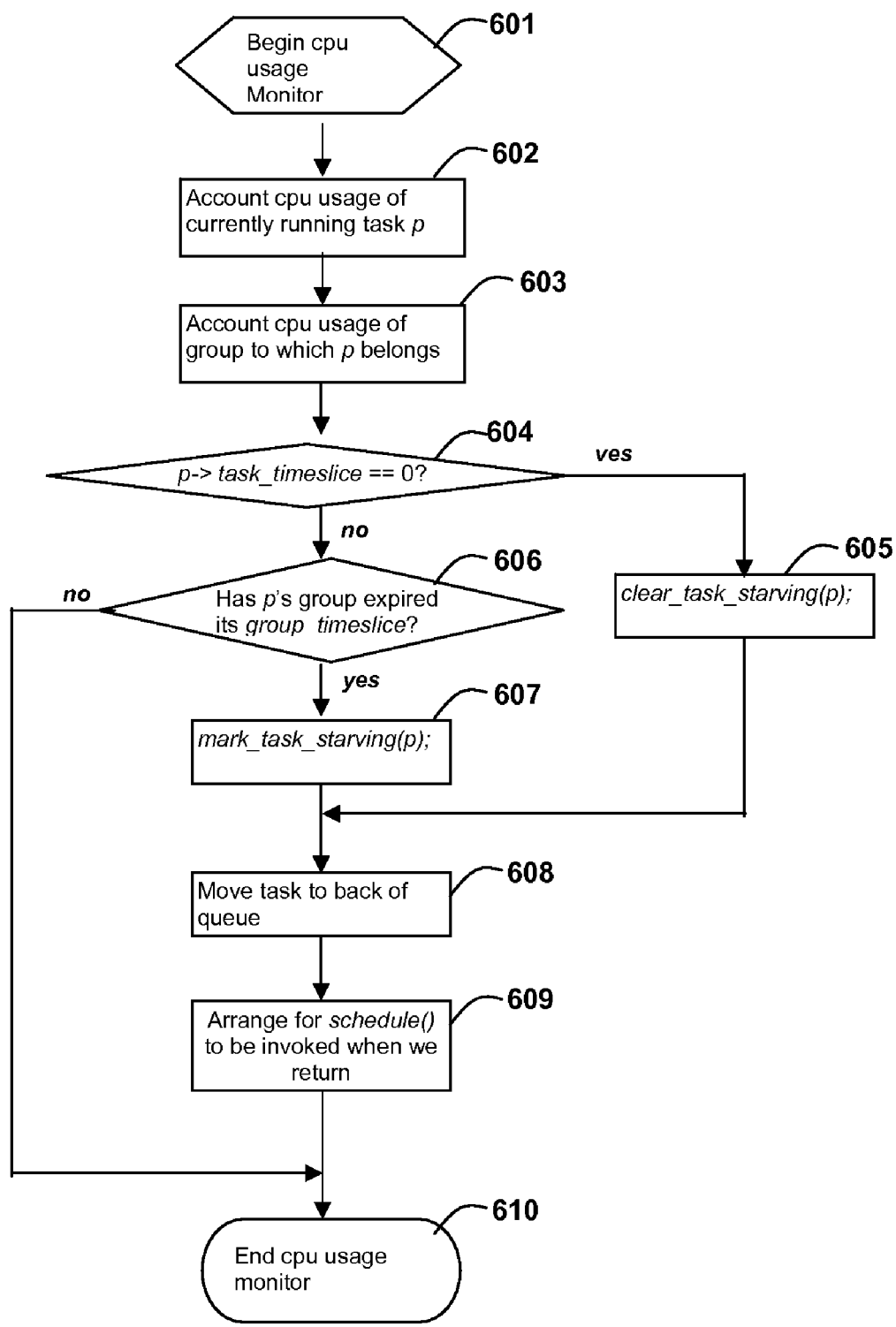
FIG. 6 illustrates an exemplary embodiment of a method for monitoring CPU usage in accordance with the present invention.

FIG. 6 illustrates an exemplary embodiment of a method 600 for monitoring CPU (processor) usage while the processor is implementing the method as disclosed in FIGS. 1 to 5. While the task continues to execute, the scheduler continuously monitors the CPU usage of the task and its group. The method for the CPU usage as a function of scheduler is detailed below. Step 601 is the entry point for the CPU usage monitor. It is usually arranged to be invoked periodically (e.g., every 1 ms), for example this can be pre-defined. Step 602 accounts the CPU usage of currently running task, by decrementing corresponding amount from its available task_timeslice. Step 603 accounts the CPU usage of the group, to which currently running task belongs, by decrementing a corresponding amount from its available group_timeslice. Step 604 checks whether the task's timeslice is zero, and if true go to step 605, else go to step 606. Step 605 is arrived at after the task has run to its full timeslice. In such a case, the task's starving status is cleared by invoking function clear_task_starving( ) and control is transferred to step 608. Next, in step 606 check is made to determine if the group, to which the currently running task belongs, has expired its group_timeslice, and if true go to step 607, else go to step 610. Step 607 is arrived at if the group, to which current running task belongs, has expired its group_timeslice. Further execution of the task should be stopped in that case. Hence this step marks the task starving by invoking function mark_task_starving( ). Step 608 moves the task to the back of the queue. Step 609 arranges for the function schedule( ), the entry point for the scheduler, to be invoked when CPU usage monitor function returns. Step 610 marks the end of the CPU usage monitor function.

Figure 7:
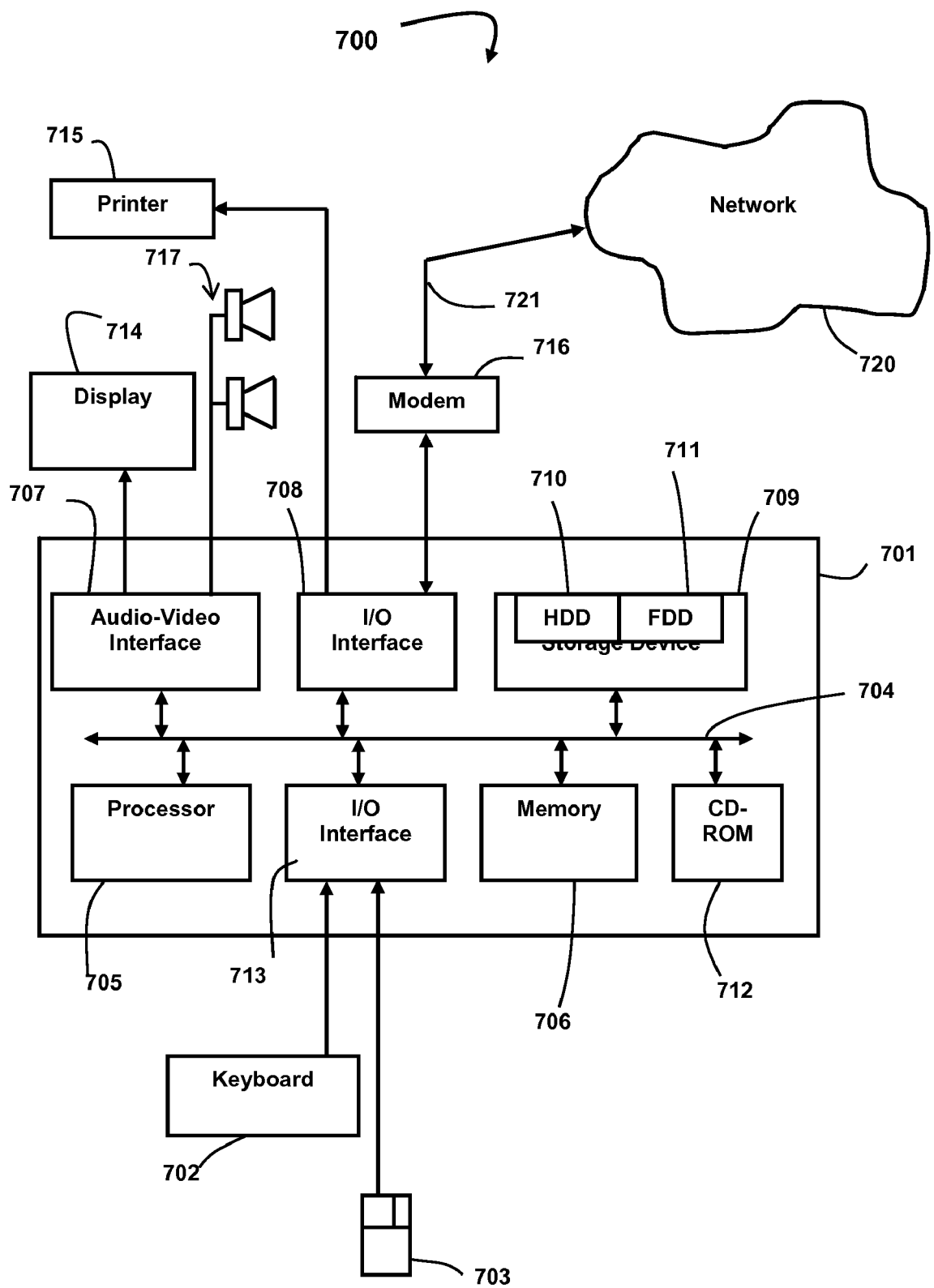
FIG. 7 illustrates an exemplary embodiment of a system capable of executing the method illustrated in FIGS. 1-6.

The methods of scheduling tasks as disclosed in FIGS. 1 to 6 may be implemented using a computer system 700, such as that shown in FIG. 7, and may be implemented on the processor in conjunction with the operating system, such as one or more application programs executable within the computer system 700. As seen in FIG. 7, the computer system 700 is formed by a computer module 701, input devices such as a keyboard 702 and a mouse pointer device 703, and output devices including a printer 715, a display device 714 and loudspeakers 717. An external Modulator-Demodulator (Modem) transceiver device 716 may be used by the computer module 701 for communicating to and from a communications network 720 via a connection 721. The network 720 may be a wide-area network (WAN), such as the Internet or a private WAN. Where the connection 721 is a telephone line, the modem 716 may be a traditional "dial-up" modem. Alternatively, where the connection 721 is a high capacity (eg: cable) connection, the modem 716 may be a broadband modem. A wireless modem may also be used for wireless connection to the network 720.

The computer module 701 typically includes at least one processor unit 705, and a memory unit 706 for example formed from semiconductor random access memory (RAM) and read only memory (ROM). The module 701 also includes an number of input/output (I/O) interfaces including an audio-video interface 707 that couples to the video display 714 and loudspeakers 717, an I/O interface 713 for the keyboard 702 and mouse 703 and optionally a joystick (not illustrated), and an interface 708 for the external modem 716 and printer 715. In some implementations, the modem 716 may be incorporated within the computer module 701, for example within the interface 708. The interface 708 may be formed by an Ethernet™ circuit card, a wireless Bluetooth or an IEEE 802.11 wireless arrangement.

The interfaces 708 and 713 may afford both serial and parallel connectivity, the former typically being implemented according to the Universal Serial Bus (USB) standards and having corresponding USB connectors (not illustrated). Storage devices 709 are provided and typically include a hard disk drive (HDD) 710. Other devices such as a floppy disk drive and a magnetic tape drive (not illustrated) may also be used.

An optical disk drive 712 is typically provided to act as a non-volatile source of data. Portable memory devices, such optical disks (eg: CD-ROM, DVD), USB-RAM, and floppy disks for example may then be used as appropriate sources of data to the system 700.

The components 705 to 713 of the computer module 701 typically communicate via an interconnected bus 704 and in a manner which results in a conventional mode of operation of the computer system 700 known to those in the relevant art. Examples of computers on which the described arrangements can be practiced include IBM-PCs and compatibles, Sun Sparcstations, Apple Mac™ or similar computer systems evolved therefrom.

Typically, the application programs discussed above are resident on the hard disk drive 710 and read and controlled in execution by the processor 705. Intermediate storage of such programs and any data fetched from the network 720 may be accomplished using the semiconductor memory 706, possibly in concert with the hard disk drive 710. In some instances, the application programs may be supplied to the user encoded on one or more CD-ROM and read via the corresponding drive 712, or alternatively may be read by the user from the networks 720. Still further, the software can also be loaded into the computer system 700 from other computer readable media. Computer readable media refers to any storage medium that participates in providing instructions and/or data to the computer system 700 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 701. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 714. Through manipulation of the keyboard 702 and the mouse 703, a user of the computer system 700 and the application may manipulate the interface to provide controlling commands and/or input to the applications associated with the GUI(s).

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

While particular embodiments of the present invention have been shown and described, it will be obvious to those skilled in the art that, based upon the teachings herein, changes and modifications may be made without departing from this invention and its broader aspects. Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware comprising several distinct elements. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for simulating a multi-queue group scheduler for scheduling tasks on a processor, the method comprising:
    identifying and creating a set of two or more task groups of related tasks;
    assigning the tasks in the set of two or more task groups into a run-queue;
    selecting a task at the start of the run-queue;
    determining if the task is eligible to be run based on a pre-defined task timeslice allocated and on a pre-defined task group timeslice allocated, and determining if presence of other older starving tasks in the run-queue are eligible to be run, wherein tasks in the run-queue are indicated as older starving tasks when an execution of the task was not eligible to execute to completion of the allocated task timeslice;
    executing the task in the pre-defined time slice, responsive to determining the task is eligible to be run; and
    repeating the identifying, assigning, selecting, determining, and executing steps for each task in the run-queue, wherein executing the task in the pre-defined time slice comprises executing at least a portion of an application program corresponding to the task.

2. The method of claim 1, wherein on determining that the task is eligible to run, further comprising:
    renewing the task timeslice if the task timeslice is zero.

3. The method of claim 1, further comprising:
    monitoring the processor usage while the task is being run.

4. The method of claim 3, wherein upon determining that the task running has consumed the allocated task group timeslice:
    terminating further execution of the task;
    associating a starving identifier (starve_id) to the terminated task; and
    moving the terminated task to the end of the run-queue.

5. The method of claim 3, wherein upon determining that the task running has consumed the allocated task timeslice:
    terminating further execution of the task;
    clearing the starving identifier of the terminated task; and moving the terminated task to the end of the run-queue, with its task timeslice field remaining at 0.

6. The method of claim 1 further comprising:
responsive to determining the task is not eligible to be run, associating a starving identifier to the task; and
moving the task to the end of the run-queue.

7. The method of claim 1, wherein a user can create task groups by selectively assigning tasks to the task groups.

8. The method of claim 1, wherein determining a task to execute/run comprising:
renewing the timeslice for all task groups if all task groups have expired the allocated timeslice or if there are no tasks in the run-queue associated with the task groups whose task group has not completed the allocated timeslice.

9. A system comprising a processor comprising tasks being scheduled to run on the processor, wherein the system is configured to perform:
identifying and creating a set of two or more task groups of related tasks;
assigning the tasks in the set of two or more task groups into a run-queue;
selecting a task at the start of the run-queue;
determining if the task is eligible to be run based on a pre-defined task timeslice allocated and on a pre-defined task group timeslice allocated, and determining if presence of other older starving tasks in the run-queue are eligible to be run, wherein tasks in the run-queue are indicated as older starving tasks when an execution of the task was not eligible to execute to completion of the allocated task timeslice;
executing the task in the pre-defined time slice, responsive to determining the task is eligible to be run;
repeating the identifying, assigning, selecting, determining, and executing steps for each task in the run-queue are executed and the run-queue become empty, wherein executing the task in the pre-defined time slice comprises executing at least a portion of an application program corresponding to the task.

10. The system of claim 9, wherein upon determining that the task is eligible to run, further comprising:
renewing the task timeslice if the task timeslice is zero; and
monitoring the processor usage while the task is being run.

11. The system of claim 10, wherein upon determining that the task running has consumed the allocated task group timeslice:
terminating further execution of the task;
associating a starving identifier (starve_id) to the terminated task; and
moving the terminated task to the end of the run-queue.

12. The system of claim 10, wherein upon determining that the task running has consumed the allocated task timeslice:
terminating further execution of the task;
clearing the starving identifier of the terminated task;
moving the terminated task to the end of the run-queue, with its task timeslice field remaining at 0.

13. The system of claim 9 further comprising:
responsive to determining the task is not eligible to be run, associating a starving status to the task; and
moving the task with the starving status to the end of the run-queue.

14. The system of claim 9, wherein determining a task to execute/run comprises:
renewing the timeslice for all task groups if all task groups have expired the allocated timeslice or if there are no tasks in the run-queue associated with the task groups whose task group has not completed the allocated timeslice.

\* \* \* \* \*